(12) United States Patent
Kramer

(10) Patent No.: US 9,902,584 B2
(45) Date of Patent: Feb. 27, 2018

(54) FOIL REMOVAL DEVICE AND A METHOD FOR REMOVING A FOIL FROM A TIRE TREAD

(71) Applicant: VMI HOLLAND B.V., RK Epe (NL)

(72) Inventor: Roel Kramer, RK Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/129,780

(22) PCT Filed: Mar. 19, 2015

(86) PCT No.: PCT/NL2015/050179
§ 371 (c)(1),
(2) Date: Sep. 27, 2016

(87) PCT Pub. No.: WO2015/163756
PCT Pub. Date: Oct. 29, 2015

(65) Prior Publication Data
US 2017/0158449 A1    Jun. 8, 2017

(30) Foreign Application Priority Data

Apr. 23, 2014    (NL) .................................... 2012668

(51) Int. Cl.
*B32B 43/00*    (2006.01)
*B32B 38/10*    (2006.01)
(Continued)

(52) U.S. Cl.
CPC ......... *B65H 19/286* (2013.01); *B32B 43/006* (2013.01); *B65H 18/026* (2013.01);
(Continued)

(58) Field of Classification Search
CPC . B32B 38/10; B32B 43/006; Y10T 156/1168; Y10T 156/1978
(Continued)

(56) References Cited

U.S. PATENT DOCUMENTS

| 6,149,758 A * | 11/2000 | Tsujimoto ......... H01L 21/67132 |
| | | 156/247 |
| 6,974,521 B2 * | 12/2005 | Schermer ............ B29C 63/0013 |
| | | 156/247 |

(Continued)

FOREIGN PATENT DOCUMENTS

| CN | 101827700 | 9/2010 | ............. B29C 63/00 |
| CN | 103707531 | 4/2014 | ............. B29D 30/06 |

(Continued)

OTHER PUBLICATIONS

Chinese Office Action (w/translation) issued in application No. 201580020901.X, dated Aug. 3, 2017 (9 pgs).
(Continued)

*Primary Examiner* — Mark A Osele
(74) *Attorney, Agent, or Firm* — Hayes Soloway P.C.

(57) ABSTRACT

Provided is a foil removal device and a method for removing a foil from a tire tread in a removal direction, wherein the foil removal device includes a foil collection unit with a winding element, a winding drive for receiving the foil at or near one of the ends of the foil, a gripper for engaging the foil prior to the removal of the foil and a gripper drive for moving the gripper from the gripping position towards the foil collection unit to partially remove the foil from the tire tread. The gripper is arranged for releasing the foil when the foil collection unit has received the foil. The winding drive is arranged for driving the winding element to engage and subsequently remove the foil. The removal device includes a displacement drive for moving the foil collection unit simultaneously with the winding drive driving the winding element.

26 Claims, 4 Drawing Sheets

(51) Int. Cl.
*B65H 19/28* (2006.01)
*B65H 18/02* (2006.01)
*B65H 20/16* (2006.01)

(52) U.S. Cl.
CPC ... *B65H 20/16* (2013.01); *B65H 2301/41306* (2013.01); *B65H 2301/41427* (2013.01); *Y10T 156/1168* (2015.01); *Y10T 156/1978* (2015.01)

(58) Field of Classification Search
USPC .................................................. 156/128.1
See application file for complete search history.

(56) References Cited

U.S. PATENT DOCUMENTS

| | | | | |
|---|---|---|---|---|
| 8,038,824 | B2* | 10/2011 | Kobayashi | H01L 21/67132 156/247 |
| 8,171,977 | B2* | 5/2012 | Kobayashi | H01L 21/67132 156/714 |
| 8,756,783 | B2* | 6/2014 | Lu | G02F 1/1303 156/247 |
| 9,102,430 | B2* | 8/2015 | Monti | B65B 69/0033 |
| 9,132,620 | B2* | 9/2015 | Ahn | B32B 43/006 |
| 9,158,051 | B2* | 10/2015 | Nam | G02B 5/3033 |
| 9,227,812 | B2* | 1/2016 | Degawa | B65H 37/00 |
| 9,315,006 | B2* | 4/2016 | Lee | B32B 38/10 |
| 9,757,935 | B2* | 9/2017 | Toyoshima | B32B 43/006 |
| 2008/0185100 | A1* | 8/2008 | Jang | B32B 43/006 156/714 |
| 2008/0225224 | A1* | 9/2008 | Toyoshima | B32B 43/006 349/187 |
| 2008/0236743 | A1* | 10/2008 | Kye | B29C 63/0013 156/714 |
| 2009/0273796 | A1 | 11/2009 | Garben et al. | 358/1.4 |
| 2015/0261206 | A1* | 9/2015 | Shiino | B25J 9/1694 700/257 |
| 2015/0319893 | A1* | 11/2015 | Ohno | B32B 43/006 156/702 |

FOREIGN PATENT DOCUMENTS

| | | | |
|---|---|---|---|
| EP | 2199071 | 6/2010 | ............ B29D 30/60 |
| JP | H10151687 | 6/1998 | ............ B29C 31/02 |
| JP | 2011189678 | 9/2011 | ............ B29D 30/08 |
| JP | 2016011171 A | * 1/2016 | |

OTHER PUBLICATIONS

International Search Report and Written Opinion issued in application No. PCT/NL2015/050179, dated Jun. 19, 2015 (10 pgs).

* cited by examiner

FOIL REMOVAL DEVICE AND A METHOD FOR REMOVING A FOIL FROM A TIRE TREAD

BACKGROUND

The invention relates to a foil removal device and a method for removing a protective foil from a tire tread.

Tire treads are usually provided with a protective foil on the application side. This protective foil needs to be removed prior to application of the tire tread to a tire carcass. Currently, the protective foil is manually removed. The removal is a time consuming process which dominates the tire tread application cycle time. Furthermore, the protective foil tears easily and is hard and heavy to be consistently removed by hand. Finally, any manual intervention during or after removal of the protective foil is likely to damage or contaminate the exposed application side of the tire tread.

It is an object of the present invention to provide a foil removal device and a method for removing a protective foil from a tire tread, which at least partially solves one or more of the aforementioned drawbacks of manual removal.

SUMMARY OF THE INVENTION

According to a first aspect, the invention provides a foil removal device for removing a foil from a tire tread in a removal direction, wherein the foil removal device comprises a foil collection unit with a winding element for collecting the foil and a winding drive for driving the winding element in a winding rotation about a winding axis, wherein the winding element is arranged for receiving the foil at or near one of the ends of the foil, wherein the foil removal device further comprises a gripper that is arranged for engaging the foil in a gripping position at or near the one end of the foil prior to the removal of the foil and a gripper drive that is arranged for moving the gripper from the gripping position towards the foil collection unit to partially remove the foil from the tire tread, wherein the gripper is arranged for releasing the removed part of the foil when the foil collection unit has received the removed part of the foil at or near the one end of the foil, wherein, after receiving the removed part of the foil, the winding drive is arranged for driving the winding element over several revolutions to engage and subsequently remove the foil by winding the foil around the winding element over several revolutions about the winding axis, wherein the removal device comprises a displacement drive that is arranged for moving the foil collection unit relative to the tire tread in the removal direction simultaneously with the winding drive driving the winding element.

Tire treads are typically sufficiently long such that a single length can be applied circumferentially and spliced around the circumference of a carcass. Removal of the foil by simply pulling the foil in the removal direction would require the foil to be pulled from one end of the tire tread until far beyond the other, opposite end of the tire tread. The increasing length of the part of the foil that is being removed would be subject to slacking, which could potentially cause the removed part of the foil to contact the remaining part of the foil that is still attached to the tire tread, thereby causing unpredictable behavior during the removal of the foil. To prevent the slack in the removed part of the foil from contacting the remaining part of the tire tread, the removed part of the foil would have to be lifted higher and higher into the air to provide enough clearance underneath the slack. The invention not only automates the removal of the foil, it also solves the abovementioned problem specifically related to the removal of foil from lengthy tire treads. The gripper according to the invention can engage and peel off a part of the foil, which removed part can subsequently be securely transferred from the gripper to the foil collection unit. By winding the foil and simultaneously moving the foil collection unit in the removal direction or the tire tread in the opposite direction, the foil can be removed by pulling on the foil in the removal direction while at the same time, the length of the removed part of the foil can be collected at the foil collection unit to prevent or reduce slacking in the removed, uncollected part of the foil.

In an embodiment the foil removal device further comprises a gripper that is arranged for engaging the foil in a gripping position at or near the one end of the foil prior to the removal of the foil and a gripper drive that is arranged for moving the gripper from the gripping position towards the foil collection unit to partially remove the foil from the tire tread, wherein the gripper is arranged for releasing the removed part of the foil when the foil collection unit has received the removed part of the foil at or near the one end of the foil. The gripper can engage and peel off a part of the foil, which removed part can subsequently be securely transferred from the gripper to the foil collection unit.

In an embodiment the gripper drive, during the movement of the gripper from the gripping position towards the foil collection unit, is arranged for rotating the gripper in a flipping rotation about a flipping axis transverse or perpendicular to the removal direction and/or parallel to the surface of the foil over an angle in the range of one-hundred to one-hundred-and-sixty degrees. During the flipping of the gripper, the engaged, removed part of the foil is taken along and flipped or rotated about the same flipping axis, such that the removed part of the foil can subsequently be pulled in the removal direction by the foil collection unit.

In an embodiment the gripper drive is arranged for moving the gripper in the removal direction beyond the foil collection unit and wherein the foil collection unit is arranged for engaging the removed part of the foil in the removal direction behind the gripper. With the foil collection unit engaging behind the gripper, the foil collection unit can securely engage the foil at the one end thereof, without the gripper hindering said engagement.

In an embodiment the removal device further comprises a tape applicator and a tape applicator drive for driving the tape applicator in an application direction, wherein the tape applicator is arranged for applying a tape in the application direction with a first part thereof in adhesive contact with the one end of the foil and a second part thereof projecting freely from the foil, wherein the gripper is arranged for indirectly engaging the foil through gripping of the freely extending, second part of the tape. By indirectly engaging the foil through gripping of the tape, it can be prevented that the gripper damages the tire tread and/or the foil.

In a preferred embodiment the application direction is transverse or perpendicular to the removal direction. Thus, the tape can be applied along the one end, transverse or perpendicular to the removal direction. This is typically parallel to the shortest, transverse side of the foil. Thus a minimum length of tape is required for the removal, thereby reducing the amount of waste during the removal.

In an embodiment the tape applicator is arranged for holding a supply of tape that is substantially longer the length of the tape that is applied to the foil, wherein the foil removal device is provided with a cutter for cutting off the tape from the supply of tape. The tape applicator can thus provide a plurality of lengths of tape, for subsequent cycles of removal. As the tape is cut at a definitive length, the amount of tape used to remove the foil can be kept to a minimum, thereby reducing the amount of waste during the removal.

In an embodiment the cutter is arranged for cutting off the tape from the supply of tape when the tape, in the application direction, is applied to a substantial part of the foil and preferably the entire foil. By applying the tape along a substantial part of the foil, the forces exerted by the gripper on the tape can be equally distributed over the foil, thereby increasing the consistency of the removal and preventing tears in the foil and/or the tape.

In an embodiment the gripper is provided with two opposing jaws which are arranged for gripping, in the application direction, a substantial part of the tape and preferably the entire tape. By having the opposing jaws of the gripper extend along and/or grip a substantial part of the foil, the forces exerted by the gripper on the tape can be equally distributed over the tape and indirectly over the foil, thereby increasing the consistency of the removal and preventing tears in the foil and/or the tape.

In an embodiment the foil collection unit is arranged for receiving the foil at or near the one end thereof that is adjacent to the tape. The combined weight of the foil and the tape can cause the one end of the foil to bend downwards on the opposite side of the winding element with respect to the remaining part of the foil, thereby reducing the chances that the foil releases from the winding element. Furthermore, the combined thickness of the tape and the foil may be greater than the distance between the pins of the winding element, thereby preventing the foil from being retracted backwards in a direction opposite to the removal direction.

In an embodiment the tape applicator comprises a sensor for detecting the position of the one end of the foil and for sending signals indicative of the detected position to the tape applicator drive to control the tape applicator to move into an application position for the application along the application direction. The sensor can further automate the application of the tape, regardless of the possibly varying characteristics of the tire tread.

In an embodiment the tape is arranged to be applied to the foil by adhesive bonding. The adhesive bonding allows for the tape to stick to the foil such that forces exerted on the tape by the gripper can be transferred to the foil.

In an embodiment the displacement drive is arranged for moving the foil collection unit relative to the tire tread in the removal direction at least at the same velocity and preferably substantially at the same velocity at which the foil is wound on the winding element. In this manner, the length of the uncollected, removed part of the foil can be kept constant or can be reduced, thereby preventing or reducing slacking.

In a preferred embodiment the winding element comprises two mutually parallel pins, wherein the pins are spaced apart for receiving the foil in between the pins at or near the one end of the foil.

In an embodiment the foil collection unit is movable in an entry direction transverse to the removal direction into a winding position in which the pins are slid over the foil on both sides of the main surface of the foil.

In an embodiment the displacement drive, preferably an XY-drive system, is arranged to move the foil collection unit. In an alternative embodiment the displacement drive is a conveyor that is arranged for supporting and displacing the tire tread relative to the foil collection unit in a direction opposite to the removal direction.

According to a second aspect, the invention provides a Method for removing a foil from a tire tread in a removal direction with the use of a foil removal device, wherein the foil removal device comprises a foil collection unit with a winding element for collecting the foil and a winding drive for driving the winding element in a winding rotation about a winding axis, wherein the foil removal device further comprises a gripper and a gripper drive, wherein the method comprises the steps of engaging the foil with the gripper in a gripping position at or near the one end of the foil prior to the removal of the foil, moving the gripper with the gripper drive from the gripping position towards the foil collection unit to partially remove the foil from the tire tread, receiving the foil at the winding element at or near one of the ends of the foil, releasing the removed part of the foil from the gripper when the foil collection unit has received the removed part of the foil at or near the one end of the foil, subsequently engaging and removing the foil by having the winding drive driving the winding element over several revolutions to engage and subsequently remove the foil by winding the foil around the winding element over several revolutions about the winding axis, wherein the removal device comprises a displacement drive, wherein the method further comprises the step of moving the foil collection unit relative to the tire tread in the removal direction simultaneously with the winding drive driving the winding element.

The gripper can engage and peel off a part of the foil, which removed part can subsequently be securely transferred from the gripper to the foil collection unit. By winding the foil and simultaneously moving the foil collection unit in the removal direction or the tire tread in the opposite direction, the foil can be removed by pulling on the foil in the removal direction while at the same time, the length of the removed part of the foil can be collected at the foil collection unit to prevent or reduce slacking in the removed, uncollected part of the foil.

In an embodiment the gripper drive, during the movement of the gripper from the gripping position towards the foil collection unit, rotates the gripper in a flipping rotation about a flipping axis transverse or perpendicular to the removal direction and/or parallel to the surface of the foil over an angle in the range of one-hundred to one-hundred-and-sixty degrees. During the flipping of the gripper, the engaged, removed part of the foil is taken along and flipped or rotated about the same flipping axis, such that the removed part of the foil can subsequently be pulled in the removal direction by the foil collection unit.

In an embodiment the gripper drive moves the gripper in the removal direction beyond the foil collection unit, wherein the foil collection unit engages the removed part of the foil in the removal direction behind the gripper. With the foil collection unit engaging behind the gripper, the foil collection unit can securely engage the foil at the one end thereof, without the gripper hindering said engagement.

In an embodiment the foil collection unit is moved in an entry direction transverse to the removal direction into a winding position in which the pins are slid over the foil on both sides of the main surface of the foil.

In an embodiment the removal device further comprises a tape applicator and a tape applicator drive for driving the tape applicator in an application direction, wherein the method further comprises the steps of applying a tape with the tape applicator in the application direction with a first part of the tape in adhesive contact with the one end of the foil and a second part of the tape projecting freely from the foil, wherein the gripper is engages the foil through gripping of the freely extending, second part of the tape. By indirectly engaging the foil through gripping of the tape, it can be prevented that the gripper damages the tire tread and/or the foil.

In a preferred embodiment the application direction is transverse or perpendicular to the removal direction. Thus, the tape can be applied along the one end, transverse or perpendicular to the removal direction. This is typically parallel to the shortest, transverse side of the foil. Thus a minimum length of tape is required for the removal, thereby reducing the amount of waste during the removal.

In an embodiment the tape applicator holds a supply of tape that is substantially longer the length of the tape that is being applied to the foil, wherein the foil removal device is provided with a cutter, wherein the method comprises the step of cutting off the tape from the supply of tape after application to the foil. The tape applicator can thus provide a plurality of lengths of tape, for subsequent cycles of removal. As the tape is cut at a definitive length, the amount of tape used to remove the foil can be kept to a minimum, thereby reducing the amount of waste during the removal.

In an embodiment the foil collection unit receives the foil at or near the one end thereof that is adjacent to the tape. The combined weight of the foil and the tape can cause the one end of the foil to bend downwards on the opposite side of the winding element with respect to the remaining part of the foil, thereby reducing the chances that the foil releases from the winding element. Furthermore, the combined thickness of the tape and the foil may be greater than the distance between the pins of the winding element, thereby preventing the foil from being retracted backwards in a direction opposite to the removal direction.

In an embodiment the tape applicator comprises a sensor, wherein the method comprises the steps of detecting the position of the one end of the foil with the sensor, wherein the sensor sends signals indicative of the detected position to the tape applicator drive, wherein the tape applicator drive controls the tape applicator to move into an application position for the subsequent application along the application direction based on the signals. The sensor can further automate the application of the tape, regardless of the possibly varying characteristics of the tire tread.

In an embodiment the displacement drive moves the foil collection unit relative to the tire tread in the removal direction at least at the same velocity and preferably substantially at the same velocity at which the foil is being wound on the winding element. In this manner, the length of the uncollected, removed part of the foil can be kept constant or can be reduced, thereby preventing or reducing slacking.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
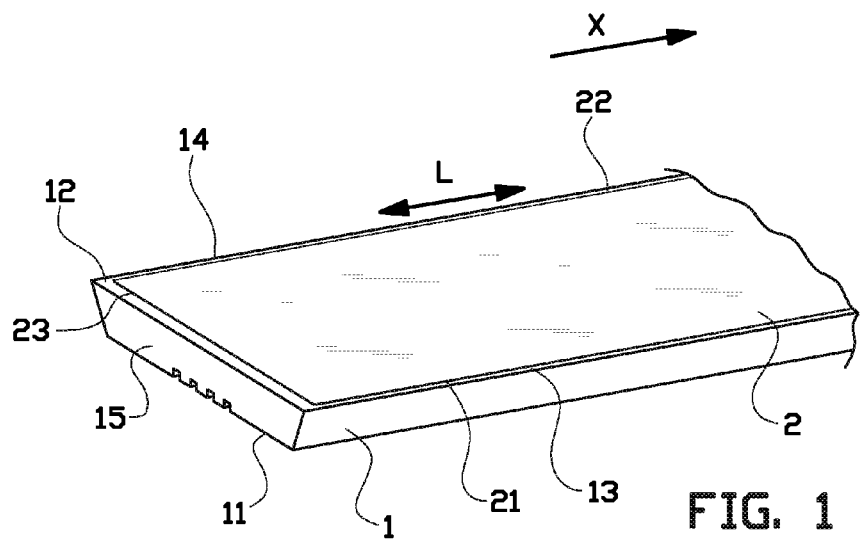
FIG. 1 shows a view in perspective of a tire tread with a protective foil.

FIG. 1 shows an elongate tire tread 1 for circumferential application to or retreading of a tire or a tire carcass (not shown). The tire tread 1 comprises an outer surface or running surface 11 which, after application, is facing radially outwards to be in contact with a road. The tire tread 1 further comprises an application side 12 which, after application, faces radially inwards and is applied or attached to the tire carcass. The tire tread 1 is provided with two longitudinal sides 13, 14 defining a longitudinal direction L. The tire tread 1, considered in the longitudinal direction L, has two transverse ends or edges that form the leading end and the trailing end of the tire tread 1 during application. Only one end 15 of the two ends is shown in FIG. 1. It is observed that removal of the protective foil can start at any of the two ends.

As shown in FIG. 1, a foil, in particular a protective film or protective foil 2 is provided on the application side 12 of the tire tread 1. The protective foil 2 protects the application side 12 of the tire tread 1 from contaminations, damage or unintended sticking to other (similar) tire components. The stickiness or tackiness of the uncured rubber material of the tire tread 1 prevents the protective foil 2 from being easily removed from the application side 12. The protective foil 2 has two longitudinal sides 21, 22 and two transverse ends. Similar to the ends of the tire tread 1, only one end 23 of the two ends of the protective foil 2 is shown in FIG. 1. The protective foil 2 is arranged on the application side 12 in an orientation with its longitudinal sides 21, 22 parallel to and within the longitudinal sides 13, 14 of the tire tread 1. The one end 23 is arranged parallel to, alongside and/or close to the one end 15 of the tire tread. Preferably, the surface area of the protective foil 2 covers at least 30-40% of the surface area of the application side 12 to optimize the protection thereof. In this example, the surface area of the protective foil 2 covers a substantial part, preferably at least 80% of the surface area of the application side 12

FIGS. 2-7 show the foil removal device according to the invention, for removing the protective foil 2 from the tire tread 1 in a removal direction X.

Figure 2:
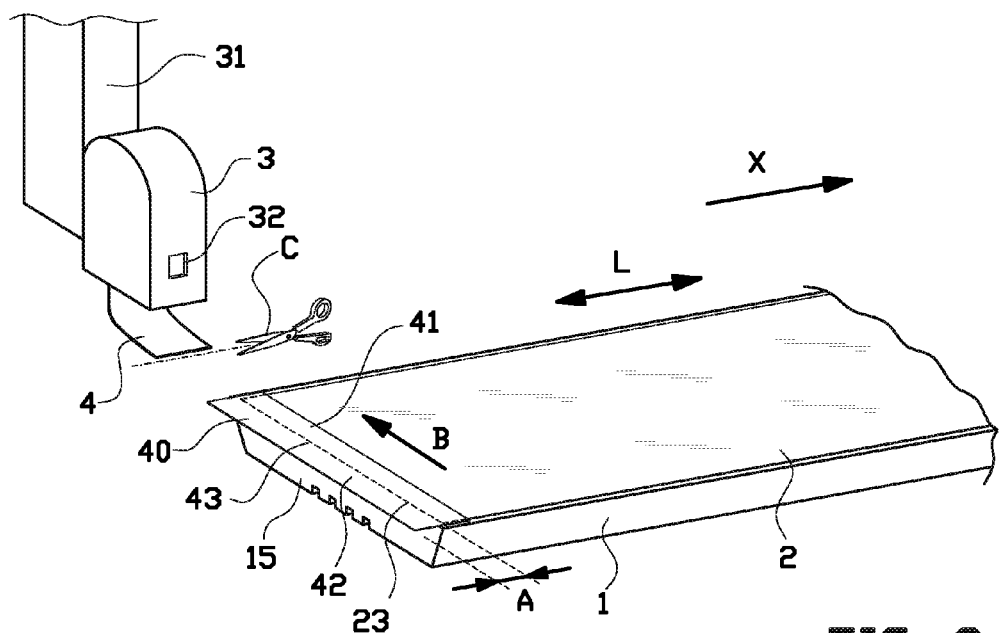
FIG. 2 shows a view in perspective the tire tread according to FIG. 1 and a tape applicator for applying a length of tape to the protective foil on the tire tread.

As shown in FIG. 2, the foil removal device comprises a tape applicator 3 with a supply of tape 4. The tape applicator 3 is arranged to be movable with respect to the tire tread 1 via a tape applicator drive 31, e.g. an XY-drive system which is known per se, in a tape application direction B along the one end 23 of the protective foil 2, perpendicular to the longitudinal direction L of the tire tread 1 and the removal direction X. During the movement along the tape application direction B, the tape applicator 3 applies a length of tape 40 from the supply of tape 4 to said one end 23 of the protective foil 2. The tape applicator 3 is arranged for applying the length of tape 40 such that, when considered in the longitudinal direction L of the tire tread 1 and the removal direction X, a first part 41 of the length of tape 40 is applied to the one end 23 of the protective foil 2 and a remaining second part 42 of the length of tape 40 extends or projects freely beyond the contour or outside of the protective foil 2 at the one end 23 thereof. Preferably, the remaining second part 42 of the length of tape 40, when considered in the longitudinal direction L of the tire tread 1 and the removal direction X, also extends or projects freely beyond the contour of or outside of the tire tread 1 at the one end 15 thereof. The length of tape 40 is provided with at least one adhesive side 43, which is adhesive at least at the first part 41 of the length of tape 40 that is in contact with the protective foil 2 at application. Preferably, the length of tape 40 is adhesive on both sides.

Optionally, the tape applicator 3 is provided with a sensor 32 for detecting the position of the one end 23 of the protective foil 2 and for sending signals indicative of said detected position to the drive of the tape applicator 3 to control the tape applicator 3 to move into an application position for the aforementioned application along the application direction B.

After application of the length of tape 40 to the protective foil 2 by the tape applicator 3, the length of tape 40 is cut off from the supply of the tape 4 by an automatic cutter (schematically shown by scissors C in FIG. 2). The length of tape 40 shall hereafter be referred to as the tape 40. The length of the tape 40, in the application direction B, substantially corresponds to the width of the protective foil 2 between the two longitudinal sides 21, 22 thereof.

Figure 3:
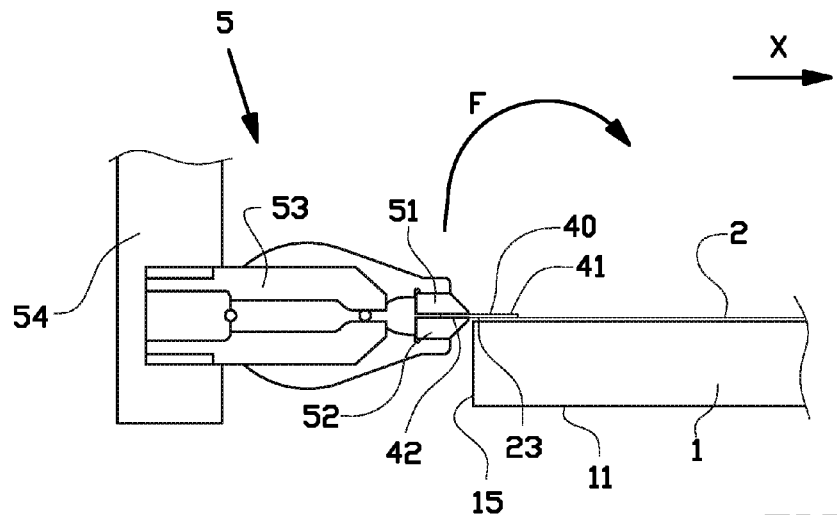
FIGS. 3 and 4 show a side view and a view in perspective, respectively, of the tire tread and the tape according to FIG. 2 and a gripper for gripping the tape and for flipping and partially removing the protective foil from the tire tread.
Figure 4:
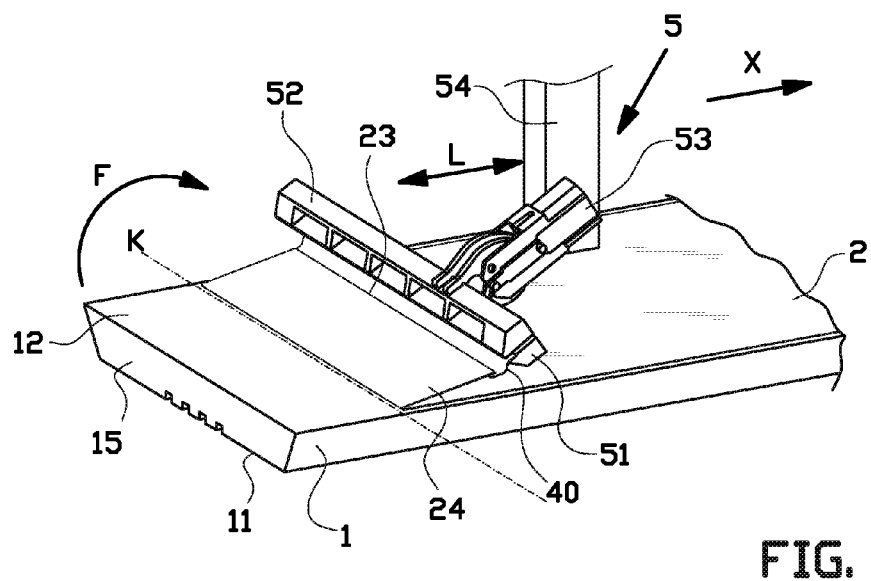
Figure 5:
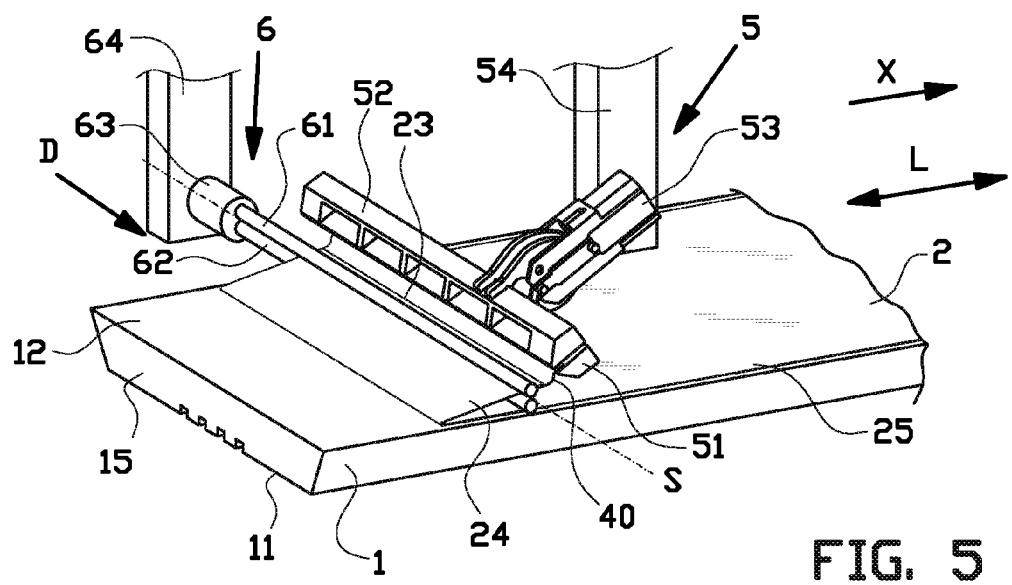
FIGS. 5, 6 and 7 show a view in perspective and two side views, respectively, of the tire tread and the partially removed tape according to FIG. 4 and a foil collection unit for removing and collection the remainder of the protective foil.
Figure 6:
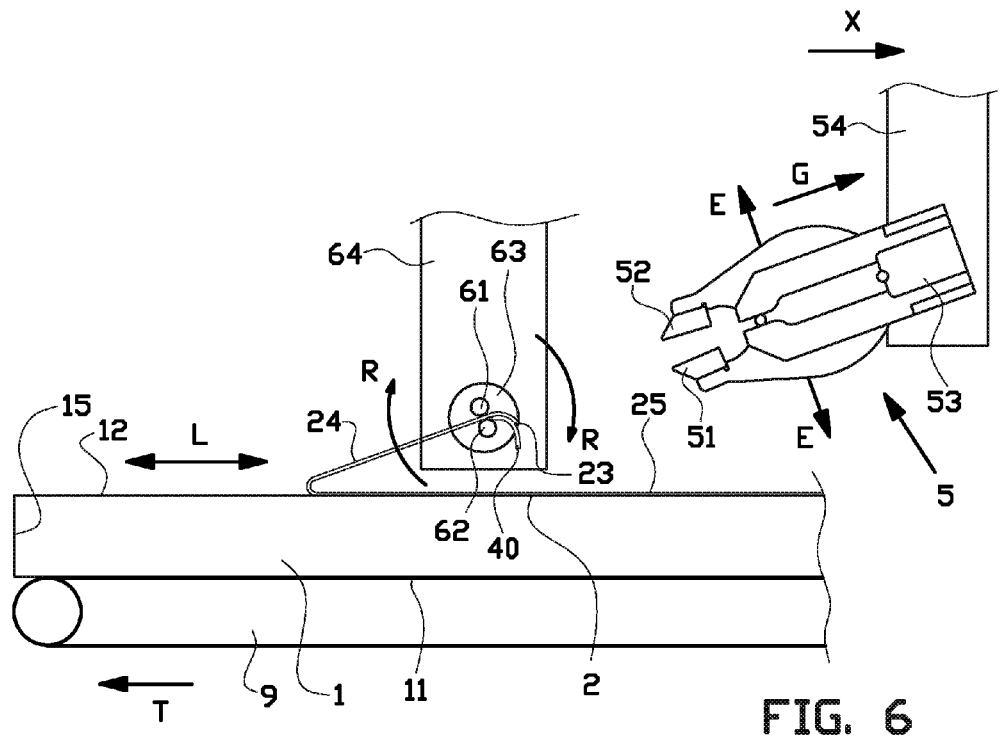

As shown in FIGS. 3-6, the foil removal device further comprises a gripper 5 for engaging the protective foil 2 through gripping of the tape 40 at the one end 23 of the protective foil 2. The gripper 5 is provided with two opposing claws or jaws 51, 52 which are reciprocally movable by a gripping mechanism 53 between a closed, gripping state as shown in FIGS. 3 and 4 and an open, releasing state as shown in FIG. 6. Optionally, the gripping jaws 51, 52 are provided with a coating or surface texture that reduces the adhesive bonding of the tape 40 to the gripping jaws 51, 52. As shown in FIGS. 4 and 5, the opposing jaws 51, 52 extend, in the application direction B (as shown in FIG. 2) over a substantial part, and in this example the entire width of the tape 40 or of the protective foil 2 between the two longitudinal sides 21, 22 at the one end 23 thereof. As shown in FIG. 4, the gripper 5 is arranged to be movable with respect to the tire tread 1 via a gripper drive 54, e.g. an XY-drive system with a rotatable mounting for the gripper 5, in a rotation in a flipping direction F about a flipping axis K. The flipping axis K extends parallel to or in the application side 12 of the tire tread 1, transverse or perpendicular to the longitudinal direction L of the tire tread 1. Optionally, the tape applicator 3 and the gripper 5 are supported on and/or driven by the same XY-drive system.

Preferably, the gripper 5 is rotated in the flipping direction F over an angle in the range one-hundred degrees to one-hundred-and-sixty degrees with respect to the horizontal orientation of the gripper 5 as shown in FIG. 3. In particular, the gripper 5 is not rotated over a full one-hundred-and-eighty degrees to prevent folding the protective foil 2 back onto itself.

Figure 7:
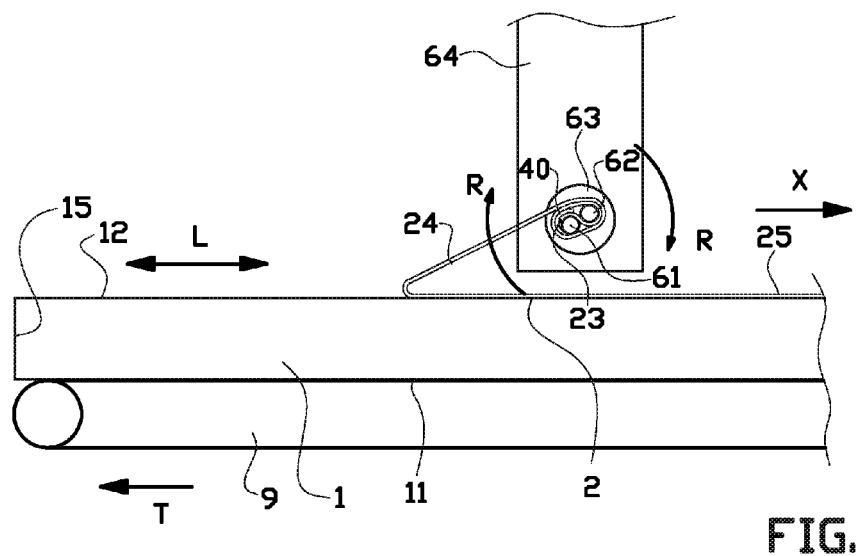

As shown in FIGS. 5, 6 and 7, the foil removal device further comprises a foil collection unit 6 for removal and collection of the protective foil 2. The foil collection unit 6 comprises a winding element in the form of two mutually parallel pins 61, 62 horizontally extending in an entry direction D transverse or perpendicular to the longitudinal direction L of the tire tread 1 and the removal direction X. The pins 61, 62 are spaced apart to allow the protective foil 2 and/or the tape 40, and in particular the thickness thereof, to pass or to be received in between the two pins 61, 62. The foil collection unit 6 is provided with a winding drive 63 for driving the pins 61, 62 in a winding rotation R about a winding axis S parallel to and in the center between the pins 61, 62. Optionally, the pins 61, 62 are movable towards each other to decrease their mutual spacing and to clamp the protective foil 2 and/or the tape 40 in between.

The foil collection unit 6 is provided with or coupled to a displacement drive 64, preferably in the form of an XY- or XYZ-drive system which is known per se, which is arranged to move the foil collection unit 6 relative to the tire tread 1 in the entry direction D into a winding position as shown in FIG. 5, and in the removal direction X as shown in FIGS. 6 and 7. Alternatively, the tire tread 1 is arranged on a displacement drive 9, preferably in the form of a conveyor (known per se), which is arranged to move the tire tread 1 relative to the foil collection unit 6 in a direction T opposite to the removal direction X, such that—in effect—the foil collection unit 6 is moved in the removal direction X with respect to the tire tread 1.

The method for removing the protective foil 2 from the tire tread 1 with the use of the aforementioned foil removal device will be elucidated below with reference to FIGS. 2-7.

In FIG. 2, the situation is shown in which the tape applicator 3 has been moved by the tape applicator drive in the application direction B along the one end 23 of the protective foil 2. During the movement of the tape applicator 3 along the one end 23 of the protective foil 2, the tape applicator 3 has applied a length of tape 40, which has been subsequently cut-off by cutter C. The resulting cut-off tape 40 has a first part 41 that is applied by adhesion to the one end 23 of the protective foil 2 and a second, remaining part 42 which extends or projects outside the protective foil 2 and the tire tread 1 at the respective ends 23, 15 thereof.

Next, in FIG. 3, the gripper 5 is introduced and driven by the corresponding gripper drive 54 into a substantially horizontal gripping position opposite to the projecting second part 42 of the tape 40. In the situation as shown in FIG. 3, the gripping mechanism 53 of the gripper 5 has been actuated to move the gripping jaws 51, 52 together to clamp or grip the projecting, second part 42 of the tape 40 from opposite sides. The gripper 5 has now indirectly engaged the protective foil 2 through gripping of the tape 40. The gripper 5 is subsequently moved by the corresponding gripper drive 54 over a rotation in the flipping direction F about the flipping axis K into a flipped position as shown in FIG. 4.

During the rotation in the flipping direction F, the gripper 5 has taken along, pulled, peeled or removed the gripped tape 40 and indirectly a part 24 of the protective foil 2 from the tire tread 1 in the removal direction X. The tape 40 and said removed part 24 of the protective foil 2 are flipped about the flipping axis K, thereby folding the removed part 24 of the protective foil 2 in the removal direction X and backwards with respect to the direction of the remaining part 25 of the protective foil 2 that is still applied to the tire tread 1. The rotation of the gripper 5 in the flipping direction F is stopped at a maximum angle of one-hundred-and-sixty degrees such that the slack in the removed part 24 of the protective foil 2 does not contact the remaining part 25 of the protective foil 2.

FIG. 5 shows the situation in which the gripper 5 is still in a gripping state, gripping the tape 40. With the gripper 5 holding the removed part 24 of the protective foil 2 stationary with respect to the tire tread 1, the foil collection unit 6 is positioned by its corresponding displacement drive 64 in the entry position at the protective foil 2 just behind or downstream of the one end 23 of the protective foil 2 and/or the tape 40 with respect to the removal direction X. The displacement drive 64 has moved the foil collection unit 6 from the entry position in the entry direction D into the winding position as shown in FIG. 5. In the winding position, the pins 61, 62 are slid over and/or extend across the width of the protective foil 2 on both sides of the main surface of the protective foil 2.

In FIG. 6, the situation is shown in which the gripping mechanism 53 has been operated to move the gripping jaws 51, 52 apart into the releasing state. The gripper drive 54 has subsequently moved the gripper 5 backwards in a retraction direction G away from the tape 40 and the protective foil 2. The forces exerted by the gripper 5 onto the tape 40 during the movement of the gripping jaws 51, 52 into the releasing state and/or the movement in the retraction direction G are greater than the adhesive bonding of the tape 40 to the gripping jaws 51, 52, thereby causing the tape 40 to detach from the gripping jaws 51, 52. The tape 40 is thus no longer gripped by the gripper 5 and the protective foil 2 is now supported and/or engaged by the foil collection unit 6. The winding drive 63 of the foil collection unit 6 may now be activated to rotate the pins 61, 62 in a winding rotation R about the winding axis S.

FIG. 7 shows the situation in which the winding drive 63 has rotated the pins 61, 62 over several revolutions or windings, thereby causing the tape 40 and the removed part 24 of the protective foil 2 to coil up or wind up around the pins 61, 62. In particular, the tape 40 is first wound against one of the pins 61, 62, after which the subsequent windings cause the downstream, still uncollected removed part 24 of the protective foil 2 to be wound up around the pins 61, 62 and the tape 40 already wound thereon. Depending on the direction in which the tape 40 is wound, or if the tape 40 is adhesive on both sides, the subsequent windings of the protective foil 2 will stick to the tape 40, thereby ensuring that the downstream removed part 24 of the protective foil 2 sticks to and is wound onto the pins 61, 62. Ultimately, after several windings, the protective foil 2 is securely engaged by the foil collection unit 6.

During or simultaneously with the winding, the corresponding displacement drive 64 is arranged for moving the foil collection unit 6 in a removal direction X parallel to the longitudinal direction L of the tire tread 1 and/or perpendicular to the winding axis S, thereby gradually pulling and removing a greater part 24 of the protective foil 2 from the tire tread 1 in the removal direction X and reducing the remaining part 25 of the protective foil 2. In particular, the displacement drive 64 is arranged for moving the foil collection unit 6 in the removal direction X up to and/or a short distance beyond the other end of the protective foil 2 and/or the other end of the tire tread 1 to enable the foil collection unit 6 to collect and wind-up the entire protective foil 2. The foil collection unit 6 is moved at a velocity in the removal direction X that is sufficient to stay ahead or upstream of the fold at the transition from the removed part 24 and the remaining part 25 of the protective foil 2. Preferably, the velocity in the removal direction X is chosen to be at least the same as, substantially the same as or dependent on the velocity at which the protective foil 2 is collected onto the foil collection unit 6. Thus, the distance that the foil collection unit 6 moves over time in the removal direction X is substantially equal to the circumferential length of each winding of the protective foil 2 on the foil collection unit 2 over the same amount of time. In this manner, the length of the uncollected, removed part 24 between the foil collection unit 6 and the remaining part 25 of the protective foil 2 remains substantially constant. In particular, slacking of the uncollected, removed part 24 between the foil collection unit 6 and the remaining part 25 of the protective foil 2 is to be reduced to an amount which does not allow the removed part 24 to contact the remaining part 25.

Instead of moving the foil collection unit 6 in the removal direction X, the tire tread 1 can be moved relative to the foil collection unit 6 in the direction T opposite to the removal direction X on the conveyor 9, thereby effectively moving the foil collection unit 6 relative to the tire tread 1 in the removal direction X.

After the protective foil 2 has been fully removed and collected from tire tread 1, the wound up protective foil 2 may be scraped off from the pins 61, 62. The protective foil 2 is disposed as waste and/or may be recycled.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

The invention claimed is:

1. A foil removal device for removing a foil from a tire tread in a removal direction, wherein the foil removal device comprises a foil collection unit with a winding element for collecting the foil and a winding drive for driving the winding element in a winding rotation about a winding axis, wherein the winding element is arranged for receiving the foil at or near one of the ends of the foil, wherein the foil removal device further comprises a gripper that is arranged for engaging the foil in a gripping position at or near the one end of the foil prior to the removal of the foil and a gripper drive that is arranged for moving the gripper from the gripping position towards the foil collection unit to partially remove the foil from the tire tread, wherein the gripper is arranged for releasing the removed part of the foil when the foil collection unit has received the removed part of the foil at or near the one end of the foil, wherein, after receiving the removed part of the foil, the winding drive is arranged for driving the winding element over several revolutions to engage and subsequently remove the foil by winding the foil around the winding element over several revolutions about the winding axis, wherein the removal device comprises a displacement drive that is arranged for moving the foil collection unit relative to the tire tread in the removal direction simultaneously with the winding drive driving the winding element.

2. The foil removal device according to claim 1, wherein the gripper drive, during the movement of the gripper from the gripping position towards the foil collection unit, is arranged for rotating the gripper in a flipping rotation about a flipping axis transverse to the removal direction or parallel to the surface of the foil over an angle in the range of one-hundred to one-hundred-and-sixty degrees.

3. The foil removal device according to claim 1, wherein the gripper drive is arranged for moving the gripper in the removal direction beyond the foil collection unit and wherein the foil collection unit is arranged for engaging the removed part of the foil in the removal direction behind the gripper.

4. The foil removal device according to claim 1, wherein the removal device further comprises a tape applicator and a tape applicator drive for driving the tape applicator in an application direction, wherein the tape applicator is arranged for applying a tape in the application direction with a first part thereof in adhesive contact with the one end of the foil and a second part thereof projecting freely from the foil, wherein the gripper is arranged for indirectly engaging the foil through gripping of the freely extending, second part of the tape.

5. The foil removal device according to claim 4, wherein the application direction is transverse or perpendicular to the removal direction.

6. The foil removal device according to claim 4, wherein the tape applicator is arranged for holding a supply of tape that is substantially longer the length of the tape that is applied to the foil, wherein the foil removal device is provided with a cutter for cutting off the tape from the supply of tape.

7. The foil removal device according to claim 6, wherein the cutter is arranged for cutting off the tape from the supply of tape when the tape, in the application direction, is applied to at least a part of the foil.

8. The foil removal device according to claim 6, wherein the gripper is provided with two opposing jaws which are arranged for gripping, in the application direction, at least a part of the tape.

9. The foil removal device according to claim 4, wherein the foil collection unit is arranged for receiving the foil at or near the one end thereof that is adjacent to the tape.

10. The foil removal device according to claim 4, wherein the tape applicator comprises a sensor for detecting the position of the one end of the foil and for sending signals indicative of the detected position to the tape applicator drive to control the tape applicator to move into an application position for the application along the application direction.

11. The foil removal device according to claim 4, wherein the tape is arranged to be applied to the foil by adhesive bonding.

12. The foil removal device according to claim 1, wherein the displacement drive is arranged for moving the foil collection unit relative to the tire tread in the removal direction at least at the same velocity at which the foil is wound on the winding element.

13. The foil removal device according to claim 1, wherein the winding element comprises two mutually parallel pins, wherein the pins are spaced apart for receiving the foil in between the pins at or near the one end of the foil.

14. The foil removal device according to claim 13, wherein the foil collection unit is movable in an entry direction transverse to the removal direction into a winding position in which the pins are slid over the foil on both sides of the main surface of the foil.

15. The foil removal device according to claim 1, wherein the displacement drive is arranged to move the foil collection unit.

16. The foil removal device according to claim 1, wherein the displacement drive is a conveyor that is arranged for supporting and displacing the tire tread relative to the foil collection unit in a direction opposite to the removal direction.

17. A method for removing a foil from a tire tread in a removal direction with the use of a foil removal device, wherein the foil removal device comprises a foil collection unit with a winding element for collecting the foil and a winding drive for driving the winding element in a winding rotation about a winding axis, wherein the foil removal device further comprises a gripper and a gripper drive, wherein the method comprises the steps of engaging the foil with the gripper in a gripping position at or near the one end of the foil prior to the removal of the foil, moving the gripper with the gripper drive from the gripping position towards the foil collection unit to partially remove the foil from the tire tread, receiving the foil at the winding element at or near one of the ends of the foil, releasing the removed part of the foil from the gripper when the foil collection unit has received the removed part of the foil at or near the one end of the foil, subsequently engaging and removing the foil by having the winding drive driving the winding element over several revolutions to engage and subsequently remove the foil by winding the foil around the winding element over several revolutions about the winding axis, wherein the removal device comprises a displacement drive, wherein the method further comprises the step of moving the foil collection unit relative to the tire tread in the removal direction simultaneously with the winding drive driving the winding element.

18. The method according to claim 17, wherein the gripper drive, during the movement of the gripper from the gripping position towards the foil collection unit, rotates the gripper in a flipping rotation about a flipping axis transverse to the removal direction or parallel to the surface of the foil over an angle in the range of one-hundred to one-hundred-and-sixty degrees.

19. The method according to claim 17, wherein the gripper drive moves the gripper in the removal direction beyond the foil collection unit, wherein the foil collection unit engages the removed part of the foil in the removal direction behind the gripper.

20. The method according to claim 19, wherein the winding element comprises two pins and wherein the foil collection unit is moved in an entry direction transverse to the removal direction into a winding position in which the pins are slid over the foil on both sides of the main surface of the foil.

21. The method according to claim 17, wherein the removal device further comprises a tape applicator and a tape applicator drive for driving the tape applicator in an application direction, wherein the method further comprises the steps of applying a tape with the tape applicator in the application direction with a first part of the tape in adhesive contact with the one end of the foil and a second part of the tape projecting freely from the foil, wherein the gripper engages the foil through gripping of the freely extending, second part of the tape.

22. The method according to claim 21, wherein the application direction is transverse to the removal direction.

23. The method according to claim 21, wherein the tape applicator holds a supply of tape that is substantially longer than the length of the tape that is being applied to the foil, wherein the foil removal device is provided with a cutter, wherein the method comprises the step of cutting off the tape from the supply of tape after application to the foil.

24. The method according to claim 21, wherein the foil collection unit receives the foil at or near the one end thereof that is adjacent to the tape.

25. The method according to claim 21, wherein the tape applicator comprises a sensor, wherein the method comprises the steps of detecting the position of the one end of the foil with the sensor, wherein the sensor sends signals indicative of the detected position to the tape applicator drive, wherein the tape applicator drive controls the tape applicator to move into an application position for the subsequent application along the application direction based on the signals.

26. The method according to claim 17, wherein the displacement drive moves the foil collection unit relative to the tire tread in the removal direction at least at the same velocity at which the foil is being wound on the winding element.

* * * * *